United States Patent [19]

Krämer et al.

[11] Patent Number: 4,908,165
[45] Date of Patent: Mar. 13, 1990

[54] APPARATUS FOR COOLING A MELT STRIP OF THERMOPLASTIC SYNTHETIC RESIN AND PROCESS

[75] Inventors: Walter Krämer, Bonn; Klemens Krumm, Neunkirchen-Seelscheid; Hans D. Ott, St. Augustin, all of Fed. Rep. of Germany

[73] Assignee: Reifenhauser GmbH & Co., Maschinenfabrik, Troisdorf, Fed. Rep. of Germany

[21] Appl. No.: 258,990
[22] Filed: Oct. 17, 1988

[30] Foreign Application Priority Data

Oct. 16, 1987 [DE] Fed. Rep. of Germany ....... 3735001

[51] Int. Cl.$^4$ .............................................. B29C 71/04
[52] U.S. Cl. ......................................... 264/22; 264/24; 264/216; 264/237; 425/174.8 E; 425/224
[58] Field of Search ................... 264/22, 24, 216, 237, 264/348; 425/174.8 E, 174.8 R, 174, 224

[56] References Cited

U.S. PATENT DOCUMENTS

| | | | |
|---|---|---|---|
| 3,686,374 | 8/1972 | Hawkins | 264/22 |
| 3,779,682 | 12/1973 | Huskey et al. | 264/22 |
| 3,796,885 | 3/1974 | Shofner | 425/174 |
| 3,820,929 | 6/1974 | Busby et al. | 264/22 |
| 3,898,026 | 8/1975 | Sauer et al. | 425/174.8 E |
| 4,059,497 | 11/1977 | Kolbe et al. | 264/22 |
| 4,166,089 | 8/1979 | De Geest et al. | 264/22 |
| 4,239,973 | 12/1980 | Kolbe et al. | 425/174.8 E |

FOREIGN PATENT DOCUMENTS

| | | | |
|---|---|---|---|
| 3208590 | 9/1983 | Fed. Rep. of Germany | 425/174 |
| 62-204922 | 9/1987 | Japan | 264/348 |

Primary Examiner—Jeffery Thurlow
Attorney, Agent, or Firm—Herbert Dubno

[57] ABSTRACT

An apparatus and method for cooling a melt strip from a wide-slot die includes a cooling roller driven at a predetermined angular velocity and juxtaposed with a corona-discharge electrode in the form of a rotation symmetrical rigid bar which is rotated about its axis at an angular velocity much greater than that of the cooling roller. The rotating corona-discharge electrode can be received in a nonrotatable insulating chamber having air inlets on a side opposite a slot-shaped outlet training ionized air onto the melt strip.

19 Claims, 2 Drawing Sheets

APPARATUS FOR COOLING A MELT STRIP OF THERMOPLASTIC SYNTHETIC RESIN AND PROCESS

FIELD OF THE INVENTION

Our present invention relates to an apparatus for cooling a melt strip of thermoplastic synthetic resin and, more particularly, to an apparatus for causing such a melt strip to adhere electrostatically to the surface of a cooling roller.

BACKGROUND OF THE INVENTION

In the long-slit or wide-mouth technique for extruding a film, foil, web or sheet of synthetic resin, the relatively wide and thin, generally noncoherent strip of molten thermoplastic material emerging from the wide mouth die at the end of the extruder must be cooled to form an extrusion with structural integrity.

One cooling technique makes use of a cooling roller or drum located immediately downstream from the mouth of the die and receiving the melt strip, which can also be referred to as a melt flag or melt banner, which passes onto the cooling surface of the roller which generally rotates at a peripheral speed such that it will match the rate at which the extrusion emerges from the die.

Because the melt strip has limited cohesion, it is important to ensure that it will adhere to the cooling roller or drum at least initially and for this purpose it has been proposed in practice to provide an electrostatic adhesion.

Juxtaposed with the drum is a wire corona-discharge electrode which generates an electrostatic field for this purpose. The cooling roller can be a counterelectrode for this field and is rotated with a predetermined angular velocity.

The corona electrode is so connected to the source of electric potential that it generates a corona discharge which, for example, can release electrons and the electrons can accumulate on the melt strip so that the latter is drawn against the positively charged counterelectrode, i.e. the cooling roller and is held against the surface thereof as the latter rotates and abstracts heat from the melt strip. When the melt strip has cooled sufficiently to form a foil or web, it can be peeled from the surface of the roller as a coherent and structurally stable member.

In the use of wire corona-discharge electrodes for such purposes for reasons which are not completely clear, visible stripes tend to be formed on the product, namely, the finished synthetic resin foil which affect the quality of the product.

Investigations have shown that in part these stripes may be due to differences in cooling effect across the width of the cooling drum or roller. For example, it is known in general that the cooling effect at the center of the cooling roller is greater than at the ends thereof.

However, these earlier associations of the cooling effectiveness with the stripes did not result in the development of a solution to the problem.

We have now found that the stripe-forming phenomenon may well be a result of the effect of the electrostatic fixing of the melt strip on the cooling roller surface.

In particular, we have discovered that the electrostatic adhesion of the melt strip to the cooling roller is not uniform over the entire width of the cooling roller. As a consequence, the heat transfer between the melt strip and the cooling roller is not uniform across the width of the latter and thus a visible stripe effect is observed.

We have found, moreover, that the variations in the electrostatic field adhesion of the melt strip to the cooling roller results from the corona-discharge electrodes which have been used. The corona-discharge wires, for example, may sag or deform so as to more closely approach the cooling roller at certain locations than at others. A contribution to this effect can result from temperature variations along the wire. Temperature differences can give rise to different electrostatic potentials so that there are different fields between the cooling electrode and the cooling wire at different points along the length of the corona wire.

The discharge may be more intensive in a sagging region at the middle of the corona electrode than at the ends thereof. Variations in the field generation resulting from variations in the thickness of the wire, simply because of manufacturing tolerances, can also contribute to the striping effect and the nonhomogeneous distribution of charge along the wire can also be a result of variations in surface roughness therealong.

OBJECTS OF THE INVENTION

It is, therefore, the principal object of the present invention to provide an improved cooling apparatus for a melt strip which will avoid the drawbacks of earlier cooling systems and especially those using corona-discharge wires for electrostatic adhesion of the melt strip to the cooling surface.

Another object of this invention is to provide an apparatus with improved means for electrostatically adhering a melt strip to a cooling roller surface so that the striping phenomenon discussed earlier cannot occur.

It is also an object of our invention to provide an apparatus for the purposes described which ensures a more uniform electrostatic adhesion of a melt strip to the cooling surface of a cooling roller for the cooling of thermoplastic extrusions from wide-mouth dies and the like.

SUMMARY OF THE INVENTION

These objects and others which will become apparent hereinafter are attained, in accordance with the present invention in an apparatus in which the corona discharge is formed as a rigid profile bar or structural shape and mounted so that the bar is rotatable about its axis.

When the term "rigid" is used herein, it is intended to thereby define a cross section of the bar which is so dimensioned and configured with respect to its length that there will be practically zero deflection or bending under the intrinsic weight of the bar. Specifically that means that the section modulus and the cross sectional or planar moment of inertia must be sufficient with respect to the length of the bar that there is no measurable sag in the latter.

The rotation of the bar, in addition, eliminates any adverse effect of even a slight tendency to sag and prevents nonuniformities in the cross section from affecting the field strength locally.

According to a feature of the invention, the bar has a rotation symmetrical cross section. The cross section can be cruciform or star shape with six or more arms.

We can also operate with a profiled bar whose cross section is Y-shaped with an angle between the arms of 120°. Preferably, however, the bar is a cylinder and especially a hollow cylinder.

The voltage which is applied to the corona discharge should be sufficient to provide the desired degree of corona discharge.

The discharge surface of the profile bar, namely the surface of the hollow cylinder, can be ground to a highly smooth finish and with high precision to ensure a fully cylindrical shape. If one does utilize a cylinder as described, deviations from a circular cross section and diameter tolerances over the length of the bar should be held as small as possible. In specific terms, therefore, the apparatus of the invention can comprise:

a cooling roller having a surface receiving a melt strip of thermoplastic synthetic resin to be cooled and rotatable about an axis;

an elongated metallic corona-discharge electrode in the form of a rigid bar extending parallel to the axis and spacedly juxtaposed with the surface;

means for applying an electrical potential across the electrode and the roller whereby the roller forms a counterelectrode for electrostatically adhering the strip to the surface by an electrostatic field generated between the electrode and the counterelectrode;

means for supporting the bar at opposite sides of the roller; and means for rotating the bar about an axis thereof during generation of the electrostatic field.

In the apparatus of the invention, tolerance-related impressions which may result in nonuniform electrostatic potentials and fluctuations in the corona discharge are by and large eliminated by the rotation of the bar and the stiffness thereof. Any fluctuations are thereby statistically distributed over the length of the bar and the width of the melt strip so that a highly uniform electrostatic attachment of the melt strip to the cooling roller results.

Of course, the bar must be rotated relatively rapidly for this effect to be reached.

We have found that the bar should be rotated at an angular velocity which is a multiple of the angular velocity of the cooling roller. Preferably, however, the bar is rotated with an angular velocity whose product with the bar diameter is greater and preferably many times greater than the product of the angular velocity of the cooling roller and its diameter.

While the profile bar serving as a corona electrode can be exposed, it has been found to be safer for operating personnel to provide the bar within an ionization chamber which can have a slit through which ionized gas can reach the melt strip.

In a preferred embodiment of the invention, the bar is rotatable in a nonrotatable ionization chamber which has at least one air-feed opening as well as an air-outlet slit, the latter extending parallel to the axis of the rod.

Preferably the ionization chamber is formed as a cylindrical sleeve parallel to the axis of the bar. In this case, a stream of ionized air can pass from the ionization chamber to charge the melt strip and cause the latter electrostatically to adhere to the cooling roller.

This ionization jet is formed most effectively when a plurality of air inlets are provided on the ionization chamber walls turned away from the slit and are disposed symmetrically with respect to an axial plane through the slit and, of course, a diameter of the sleeve extending through the slit.

To control the corona discharge and the electrostatic adhesion of the melt strip to the cooling roller, we can regulate the distance of the profile rod and/or the ionization chamber from the surface of the cooling roller. In addition and in accordance with a preferred embodiment of the invention, the profiled bar and/or the ionization chamber can be moved back and forth in the axial direction and with a relatively high frequency. When the profile bar has a cruciform or star-shaped cross section, a pump-effect can be generated by rotation of the profile bar to assist in driving the jet of ionized air out of the slit in the sleeve.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
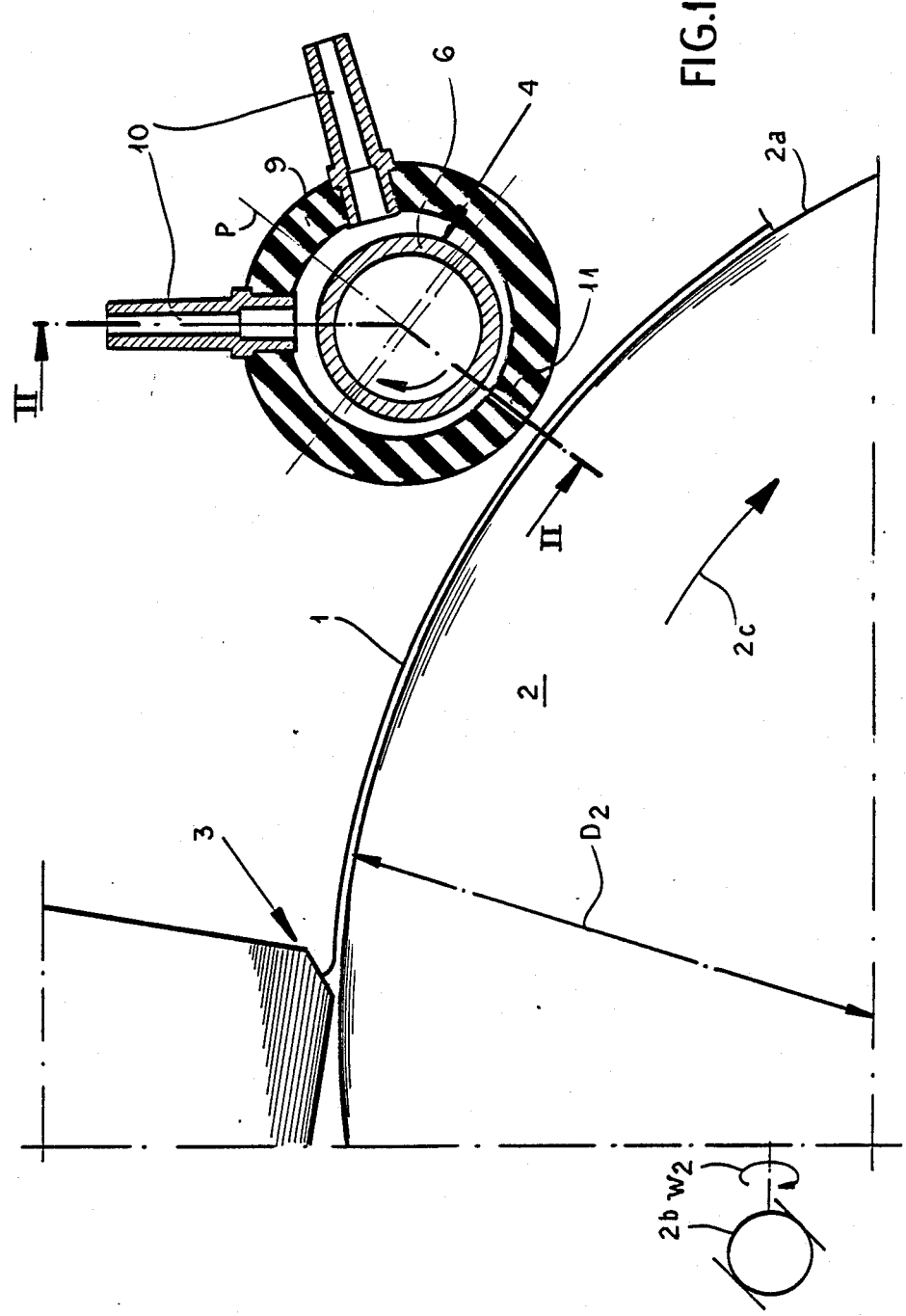
FIG. 1 is a cross sectional view through the ionization device of the apparatus of the present invention.
Figure 2:
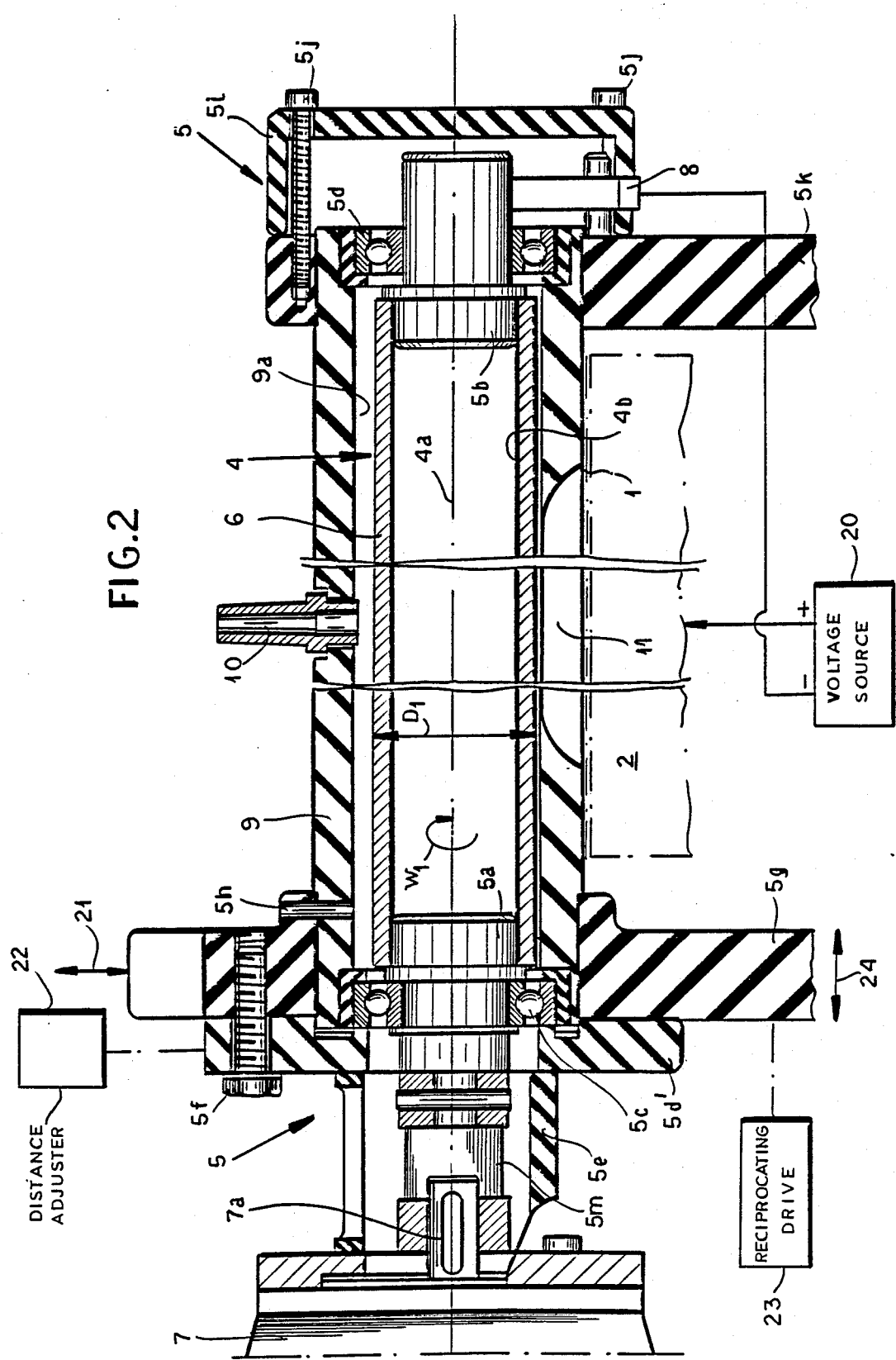
FIG. 2 is a cross sectional view taken along the line II—II of FIG. 1.

The drawing shows a melt strip 1 emerging from a wide-slit die or nozzle 3 and composed of thermoplastic synthetic resin as extruded from this die onto a cooling roller 2 having a cylindrical surface $2a$ of metal to which the melt strip 1 is to electrostatically adhere. The cooling roller 2 is rotated in the direction of the arrow $2c$ by a drive $2b$ so that angular velocity $w_2$ can be selected for the cooling roller 2 whose surface $2a$ has a diameter $D_2$. The roller 2 is cooled by means not shown, e.g. circulating cooling water.

The corona-discharge electrode 4 which is juxtaposed with the roller 2 has an axis $4a$ which is parallel to that of the roller 2 and is journaled on a mounting device represented generally at 5. This mounting device can include a pair of shafts $5a$ and $5b$ force-fitted into the hollow interior $4b$ of the circularly cylindrical hollow bar 4 and journaled in respective bearings $5c$ and $5d$ in an electrically insulating sleeve 9 defining an ionization chamber $9a$ in which the bar 4 is rotated.

At its right-hand end, the shaft $5b$ is engaged by brush 8 transferring the potential from a voltage source 20 to the corona electrode 4. The opposite polarity of this source is applied to the cooling roller 2 which acts as a counterelectrode.

The rigid bar 4 is driven by a motor 7 whose housing is connected by a spacer $5e$ to a flange $5d$ joined by bolts $5f$ to a support $5g$. The sleeve 9 is held against rotation on the support $5g$ by a pin $5h$.

At the opposite end a cap $5i$ is connected by bolts $5j$ to the support member $5k$ connected to member $5g$.

The shaft $7a$ of the motor is keyed to a shaft connector $5m$ connected in turn to the shaft part $5a$.

The assembly $5g$, $5k$ can be shifted in the direction of arrow 21 by a servomotor 22 controlling the spacing between the bar 4 and the surface $2a$ of the cooling roller. In addition, a reciprocating drive 23 is connected to members $5g$, $5k$ to move the bar 4 and the sleeve 9 back and forth in the direction of arrow 24.

The bar 4 has a diameter $D_1$ and is rotated with an angular velocity $w_1$ about its axis $4a$.

In operation and in accordance with the method of the invention, the product $w_1 \times D_1$ is much greater and preferably many times greater than the product $w_2 \times D_2$.

In this embodiment, the profiled bar is a hollow cylinder 6 and the crossing diameters represented in dot-dash lines in FIG. 1 indicate that this bar may alternatively have a cruciform or similar profile.

The ionization chamber 9 is composed of electrically insulating material and has two air-inlet openings which are disposed symmetrically with respect to an axial plane P (FIG. 1) on a side of the sleeve turned away from the air-outlet slit 11 which lies in this plane. As a result, when compressed air is fed through the inlets 10, a stream of ionized air is directed onto the melt strip 1 so that the latter captures the electrical charge and is drawn by the opposite charge on the roller 2 against the surface 2a thereof to cool the melt strip and to render it coherent.

We claim:

1. An apparatus for the cooling of a melt strip, comprising:
    a cooling roller having a surface receiving a melt strip of thermoplastic synthetic resin to be cooled and rotatable about an axis;
    means forming a nonrotatable ionization chamber composed of electrically insulating material and enclosing an axis, said chamber having an air outlet slit extending parallel to said axes and opening toward said surface, and at least one air inlet communication with said chamber;
    an elongated metallic corona-discharge electrode in the form of a rigid bar extending parallel to said axes in said chamber, said bar being rotatable about said axis enclosed by said chamber and forming an axis of said bar,
    means for applying an electrical potential across said electrode and said roller whereby said roller forms a counter-electrode for electrostatically adhering said strip to said surface by an electrostatic field generated between said electrode and said counter-electrode;
    means for supporting said bar at opposite sides of said roller; and
    means for rotating said bar about said axis enclosed by said chamber during generation of said electrostatic field.

2. The apparatus defined in claim 1 wherein said bar has a rotation-symmetrical cross section.

3. The apparatus defined in claim 2 wherein said bar is of cylindrical configuration.

4. The apparatus defined in claim 3 wherein said bar ia formed as a hollow cylinder.

5. The apparatus defined in claim 1 wherein said means for rotating said bar is constructed and arranged to rotate said bar at a first angular velocity which is a multiple of a second angular velocity with which said roller is rotated.

6. The apparatus defined in claim 5 wherein said bar is rotated so that a product of a diameter of said bar and said first angular velocity is greater than a product of a diameter of said roller and said second angular velocity.

7. The apparatus defined in claim 1 wherein said means forming said chamber is a cylindrical sleeve having an axis parallel to the axis of said bar.

8. The apparatus defined in claim 7 wherein said sleeve is formed with a plurality of air inlets disposed symmetrically with respect to an axial plane of said sleeve through said slit.

9. The apparatus defined in claim 8, further comprising means for reciprocating said bar axially.

10. The apparatus defined in claim 8, further comprising means for reciprocating said sleeve axially.

11. The apparatus defined in claim 8 wherein said bar has a rotation-symmetrical cross section.

12. The apparatus defined in claim 11 wherein said bar is of cylindrical configuration.

13. The apparatus defined in claim 12 wherein said bar is formed as a hollow cylinder.

14. The apparatus defined in claim 13 wherein said means for rotating said bar is constructed and arranged to rotate said bar at a first angular velocity which is a multiple of a second angular velocity with which said roller is rotated.

15. The apparatus defined in claim 14 wherein said bar is rotated so that a product of a diameter of said bar and said first angular velocity is greater than a product of a diameter of said roller and said second angular velocity.

16. The apparatus defined in claim 1, further comprising means forming a nonrotatable ionization chamber composed of electrically insulating material and enclosing said bar and in which said bar is rotatable, said chamber having an air outlet slit extending parallel to said axes and opening toward said surface, and at least one air inlet communicating with said chamber.

17. The apparatus defined in claim 16 wherein said means forming said chamber is a cylindrical sleeve having an axis parallel to the axis of said bar.

18. The apparatus defined in claim 7 wherein said sleeve is formed with a plurality of air inlets disposed symmetrically with respect to an axial plane of said sleeve through said slit.

19. A method of electrostatically adhering a melt strip of thermoplastic synthetic resin to a surface of a cooling roller rotated at a given angular velocity, comprising the steps of:
    (a) feeding a melt strip of thermoplastic synthetic resin to a surface of a cooling roller rotated at a given angular velocity;
    (b) juxtaposing with said strip and said surface an elongated metallic corona-discharge electrode in the form of a rigid bar extending parallel to an axis of rotation of said roller, spacedly juxtaposed with said surface and supported on opposite sides of said roller;
    (c) applying an electric potential across said bar and said roller to constitute said roller as a counterelectrode and generate an electrostatic field adhering said strip to said surface; and
    (d) rotating said bar about an axis thereof with a first angular velocity which is a multiple of a second angular velocity of said roller and such that a product of a diameter of said bar and said first angular velocity is greater than a product of a diameter of said roller and said second angular velocity.

* * * * *